April 20, 1937.  H. G. AXTMANN  2,077,914
BRAKE
Filed July 28, 1932  2 Sheets-Sheet 2
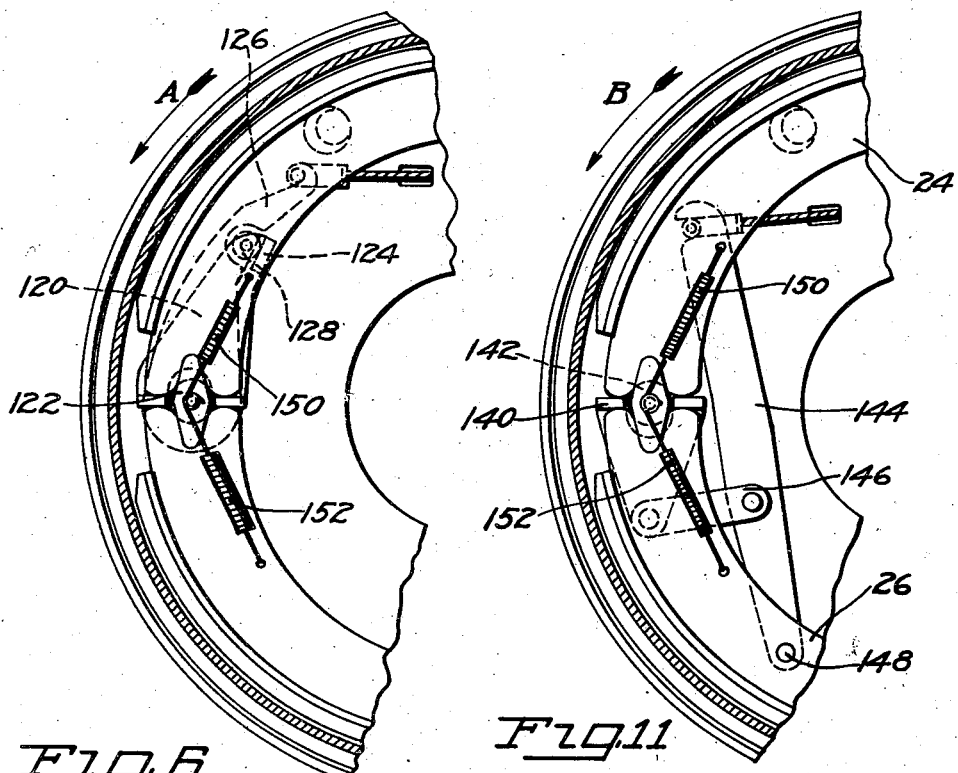
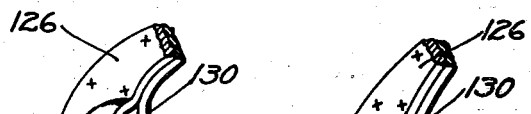
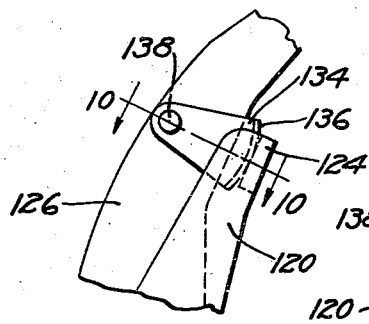
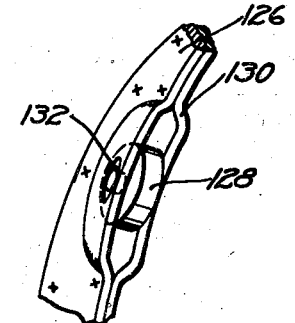
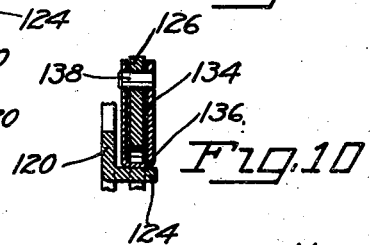
INVENTOR.
HAROLD G. AXTMANN
BY
ATTORNEY Patented Apr. 20, 1937

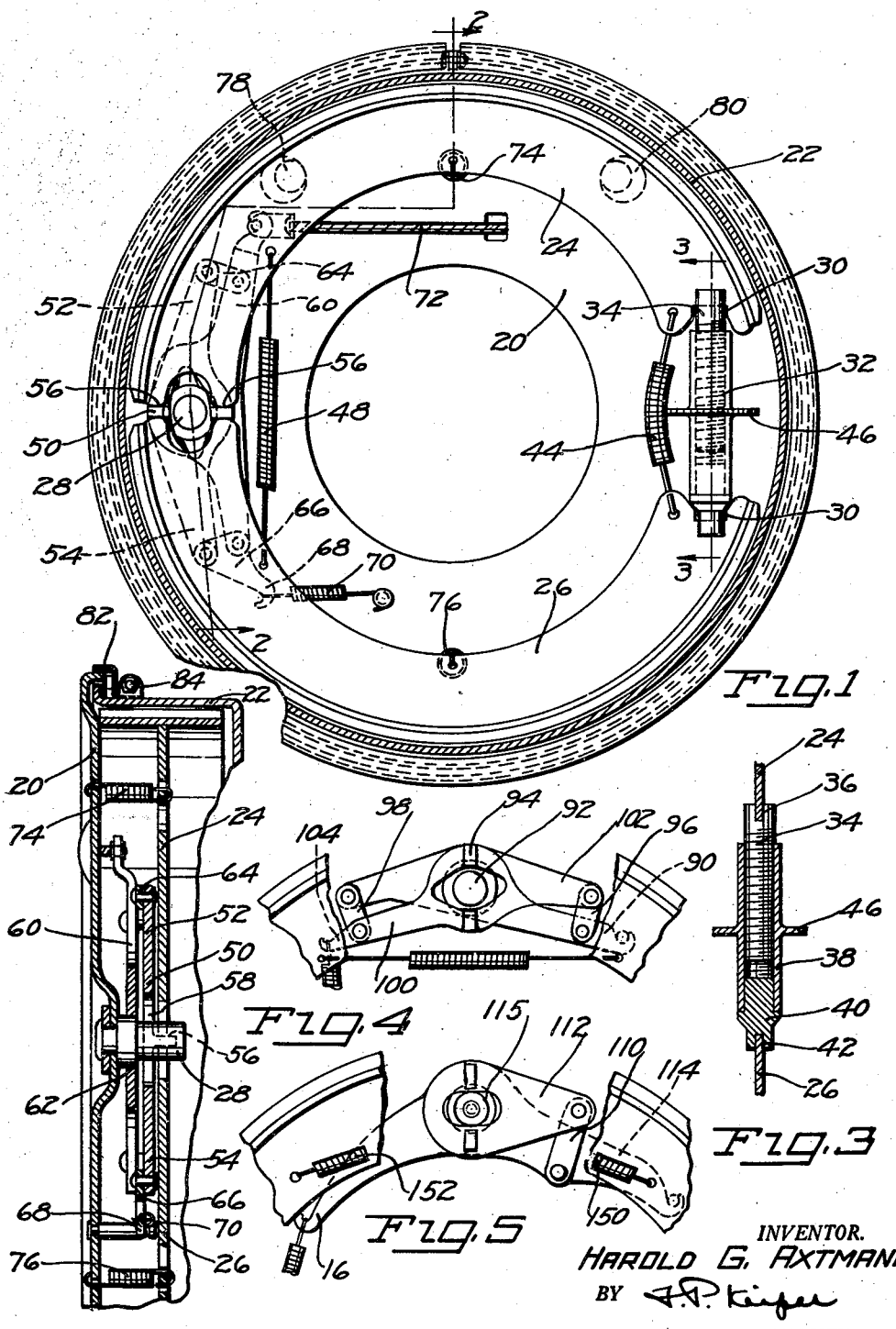

2,077,914

UNITED STATES PATENT OFFICE 2,077,914

BRAKE

Harold G. Axtmann, South Bend, Ind., assignor to Bendix Aviation Corporation, South Bend, Ind., a corporation of Delaware Application July 28, 1932, Serial No. 625,494

11 Claims. (Cl. 188—78)

This invention relates to brakes and is illustrated as embodied in a brake of the internal expanding single anchor type wherein floating friction shoes are used.

In the above type of brake employing friction means such as a pair of shoes linked together and adapted to float to an anchor means, located adjacent one pair of shoe ends, considerable difficulty is had in providing an actuating cam which is readily adapted to float with the shoes and actuate the shoes an equal amount regardless of the direction of rotation of the brake. Such difficulty arises from the fact that upon one direction of rotation the cam anchors or fulcrums about a point upon one shoe which is further from the center of the brake than the point at which the same cam anchors on the other shoe when the brake is rotating in reversed direction. Such action results in unequal cable or linkage movement for the same braking effect when rotating in one direction or in reverse direction.

In four wheel brake installations wherein a pair of cams or the like operating means for brakes at the front of the vehicle rotate in effect in a reverse direction from those for the brakes at the rear of the vehicle, the parts in the front wheel brakes being reversed with respect to the corresponding parts in the rear wheel brakes, considerable difficulty results since the actuating cables or links of the various brakes which are hooked up for simultaneous action do not have the same travel for an equal brake application. Should the parts of the rear wheel brakes be arranged the same as the parts of the front wheel brakes rather than reversed, the control pedal movement would have to be greater for one direction of braking than for the other thus requiring a large reserve pedal movement for safety purposes.

The invention is adapted to overcome these difficulties by utilizing the floating movement of the shoes in a manner so as to control the actuating cable or linkage movement, and give equal action for either direction of rotation.

It is accordingly an object of this invention to provide an actuating mechanism, which may be free to float but which may, by its floating movement, correct the errors due to floating.

A further object is the provision of linkage for actuating a floating cam which has low frictional resistance and which may correct for the floating movement of the cam.

A still further object is the provision of a brake having a floating cam and pivoted lever and a connection between them having low friction adapted to equalize the lever travel by employing floating movement of the cam.

A further object of the invention is the provision of actuating levers and novel connecting means in a single anchor duo servo type of brake whereby the ultimate cable or actuating linkage movement will be the same in either direction of drum rotation.

A still further object is the provision of linkage for equalizing the cam effectiveness in which friction may be reduced to a minimum.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views;

Figure 1 is a front elevation of a brake partly in section, illustrating a preferred form of actuating cam;

Figure 2 is a section taken on the line 2—2 of Figure 1 illustrating the details of the cam;

Figure 3 is a section taken on the line 3—3 of Figure 1 illustrating the adjustment construction;

Figure 4 is a modified form of actuating cam which may be used in Figure 1;

Figure 5 is another modified form of actuating cam readily adapted for use in a construction similar to Figure 1;

Figure 6 is a further modified form, adapted to reduce friction;

Figure 7 illustrates a portion of the actuating lever of Figure 6, with a roller therein;

Figure 8 is a slightly modified construction of Figure 7;

Figure 9 illustrates a different modification utilizing a segmental roller to reduce friction;

Figure 10 is a section of Figure 9 taken on the line 10—10; and

Figure 11 is a further modification of an actuating mechanism adapted to compensate for floating movement of the shoes.

Referring more particularly to Figure 1, it will be seen that there is shown the usual brake having a backing plate 20, brake drum 22, friction shoes 24 and 26, and an anchor 28. At one end, the shoes are notched as at 30 to receive the notched ends of an adjustment link 32 which comprises a threaded member 34 notched as at 36 to receive the shoe web, and a threaded sleeve 38 swivelly mounted upon the shouldered member 40, which is notched at 42 to receive the other shoe web 26. The usual spring 44 connects the shoes together and engages the notched periphery of an adjustment wheel 46 rigidly secured to the threaded sleeve 38.

The other ends of the shoes are urged into engagement with the anchor 28 by any suitable means such as a spring 48, and floatingly mounted upon the anchor is provided a lug type of cam 50 having extending arms 52 and 54 and cam surfaces 56. In order that the cam may float freely with respect to the anchor, a large slotted aperture 58 is therein provided to adequately clear the anchor during all normal operations of the brake. To actuate the cam, a second lever 60 is provided which is pivoted on the anchor as at 62, and which is connected to the actuating cam arms 52 and 54 through the intermediary of normally radially extending links 64 and 66, which permits the floating movement of the cam 50. The radially positioned links permit a floating movement of the cam which provides for equal action in either direction of rotation. To retain the parts in tight engagement with each other and reduce rattling, the link 66 may be provided with an offset hook 68 which is in turn connected by the return spring 70 to the backing plate. The spring thereby performs the dual function of urging the parts to release position and also of preventing looseness between the parts.

For the purpose of actuating the lever 60, a flexible cable 72 may be utilized which leaves the brake through a passage in the backing plate adapted to secure a flexible conduit. Steady rests 74 and 76 together with any suitable eccentrics such as 78 and 80 may be provided to keep the brake in proper adjustment. To prevent access of dirt and foreign substances, the brake drum may also be provided with a guard band 82, made of metal, rubber or any suitable material and clamped in position by the bolt 84.

Referring to the modified construction of Figure 4, it will be observed that the operating lever 90 is pivoted to the anchor 92, and crosses the actuating lug cam 94 which is floatingly mounted upon the anchor. Accordingly, the links 96 and 98 are both tension links, and permit the arms 100 and 102 of the cam member 94 to take a position diagonal rather than tangential at the anchor point such as is shown in Figure 1. Such a construction permits the applied position of the cam to assume a tangential position and in addition to the links provides an additional correction factor. The cam in this modification is provided with the return spring hook 104.

The modification of Figure 5 is similar to Figure 1 with the difference that only a single link 110 is shown connecting the cam 112 and lever 114. The link as before is adapted to assume a normally radial position. To compensate for the use of only a single link, the slot 115 in the cam member does not permit floating in all directions as was the case with Figures 1 and 4, but is of the same width as the anchor, so as to permit circumferential movement only. Since only one arm is used on the cam, it is preferable to extend the operating lever 114 to form a return spring hook 116. It will be obvious that either of the links of Figures 1 or 4 may equally well be dispensed with following the principles of Figure 5.

A further modification illustrated in Figure 6, employs a cam 120 substantially circumferentially floatingly mounted on the anchor 122 which is provided with a lug 124, having an upper surface so sloped or generated as to give a correction for the cam upon its circumferential movement with respect to the lever 126 which is pivotally mounted on the anchor 122. To reduce friction, a roller 128 is provided therein which may be mounted in either of the forms shown in Figures 7 or 8. More particularly, a preferred construction is therein shown wherein the lever 126 is made of a pair of stampings displaced as at 130 to form a recess for the roller 128. In Figure 8 a slot 132 is provided for the roller pivot to further reduce friction. This slot should preferably extend substantially parallel to the roller surface on the lug 124. In Figure 9 a segmental roller 134 is shown comprising a U-shaped strip being formed with an arcuate folded edge 136 which is adapted to roll on the lug 124, and pivot on the pin 138.

The modification of Figure 11 is similar to those of Figures 1, 4, 5, and 6 with the difference that the actuating lever is pivoted to one of the shoes rather than the anchor. As shown, the actuating cam 140 is floatingly mounted with respect to the anchor 142 and is connected to the lever 144 by the link 146. When the brake is applied and the drum rotating, in the direction of the arrow B, the shoe 26 is carried counterclockwise, moving the pivot 148 of the lever 144. Such movement corrects for the usual inequality present in the usual brake, since in reverse rotation the shoe 26 anchors against the anchor 142 and carries the pivot with it.

In the modifications of Figures 5, 6 and 11, the springs 150 and 152 secured to an extension on the anchor pin may be unequal in strength to assure absence of click in one direction of rotation.

In operation, the radial links of Figures 1, 4 and 5, and its equivalent in Figure 6 provide for an angular movement between the cam and operating lever dependent upon the position to which the cam floats. The action of the links is in each case similar to that of the roller and cam of Figure 6 since the arc of the links utilized is small, and the movement of the cam may be assumed to be substantially perpendicular to the link. Retaining the lever stationary it will be seen that movement of the cam relative thereto will tend to rotate the same about the anchor and provide a correction factor, the extent of which may be varied by the direction of the links, slope of the lug (Figure 6) or positioning of the fulcrum, and pivot points of the lever (shown in Figure 11).

Though several embodiments and modifications of the invention have been illustrated and described it is to be understood that the invention is not limited thereto but may be embodied in various mechanical forms. For example, the various principles may be applied to other modifications and as such changes in construction and arrangement of parts may be made without departing from the spirit of the invention, as will be apparent to those skilled in the art, reference will be had to the appended claims for a definition of the limits of the invention.

What is claimed is:

1. A brake comprising a drum, floating friction means, a backing plate having a single anchor projecting therefrom, and actuating means floatingly mounted on said anchor, and a lever pivoted on said anchor and connected to said actuating lever by a radially extending link.

2. A brake comprising a drum, a support, floating friction means thereon, a single anchor mounted on and projecting from said support, actuating means floatingly mounted on said anchor, and a lever pivoted to said friction means connected to said actuating means by a radially extending link.

3. A brake comprising a drum, a support at the open side of the drum, floating friction means, a single anchor therefor mounted on said support and projecting into the drum, an actuating cam floatingly mounted on said anchor, an operating lever for actuating said actuating cam, and a substantially radially extending link connecting said cam with said lever.

4. In a brake, a support having an anchor mounted thereon and projecting therefrom, an actuating cam floatingly mounted thereon, a lever pivoted thereon, and a substantially radially extending link connecting said lever with said cam.

5. In a brake, an anchor, an actuating cam floatingly mounted thereon and having arms extending on either side, a lever pivoted on said anchor, and a pair of substantially radially extending links connecting each of said arms with said lever.

6. In a brake, a support having an anchor mounted thereon and projecting therefrom, a lever pivoted thereon, a cam floating thereon, and having thrust parts respectively radially inside and outside of said anchor and a pivoted thrust member adapted to transmit a substantially radial thrust from said lever to said cam.

7. A brake comprising a drum, floating friction means therein, an anchor therefor, a spreading cam having oppositely extending arms floatingly mounted on said anchor, a lever pivoted at a central point on said anchor, radially extending links connecting said arms with said lever, one of said links being provided with an offset hook portion, and a release spring retained by said hook.

8. A brake comprising a drum, floating friction means, a single anchor, actuating means floatingly mounted on the anchor, a lever pivoted on the anchor and connected to the actuating means by a link extending at an angle to a radius passing through the brake anchor.

9. In a brake, a floating actuating means, arms extending oppositely therefrom, an anchor, a lever pivoted on said anchor and bearing crossed relation to said actuating means, and means connecting said arms with said lever.

10. In a brake, a floating actuating means, a pivoted lever, a link connecting said means and lever, and an offset hook on said link for carrying a return spring.

11. In a brake, an actuating lever, an operating lever, means connecting said levers having an offset return spring hook.

HAROLD G. AXTMANN.